United States Patent
Chen et al.

(10) Patent No.: US 9,658,386 B2
(45) Date of Patent: May 23, 2017

(54) BACKLIGHT SOURCE AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Shounian Chen, Beijing (CN); Dong Chen, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 68 days.

(21) Appl. No.: 14/804,686

(22) Filed: Jul. 21, 2015

(65) Prior Publication Data

US 2016/0103273 A1    Apr. 14, 2016

(30) Foreign Application Priority Data

Oct. 10, 2014   (CN) .......................... 2014 1 0530960

(51) Int. Cl.
   *F21V 8/00*        (2006.01)

(52) U.S. Cl.
   CPC ......... *G02B 6/0065* (2013.01); *G02B 6/0088* (2013.01); *G02B 6/0055* (2013.01)

(58) Field of Classification Search
   CPC .. G02B 6/0065; G02B 6/0088; G02B 6/0055; G02B 6/0086; G02B 6/0093; G02B 6/0081; G02F 1/133308; G02F 1/133317; G02F 1/133314; G02F 1/13332; G02F 1/133615; F21V 15/00; F21V 15/01; F21V 15/013
   See application file for complete search history.

(56) References Cited

U.S. PATENT DOCUMENTS

| 9,323,087 B2 * | 4/2016 | Kubo ................ G02F 1/133308 |
| 2015/0116628 A1 * | 4/2015 | Huang ................ G02B 6/0091 349/58 |

(Continued)

FOREIGN PATENT DOCUMENTS

| CN | 2000-056303 A | 2/2000 |
| CN | 202561673 U | 11/2012 |

(Continued)

OTHER PUBLICATIONS

First Chinese Office Action dated Aug. 2, 2016; Appln. No. 201410530960.9.

*Primary Examiner* — Bao Q Truong
(74) *Attorney, Agent, or Firm* — Ladas & Parry LLP

(57) ABSTRACT

A backlight source and a display device are disclosed. The backlight source includes a frame, an optical film sheet, a light guiding plate and an embedded block. The coefficient of volume expansion of the embedded block is greater than the coefficient of volume expansion of the frame; the frame has a first transverse protrusion formed at a side in proximity to a light guiding plate, a bottom surface of the first transverse protrusion is attached to the light guiding plate by pressing, and the bottom surface has a groove provided therein, in which the embedded block is arranged.

13 Claims, 2 Drawing Sheets

(56) References Cited

U.S. PATENT DOCUMENTS

| | | | |
|---|---|---|---|
| 2015/0212261 A1* | 7/2015 | Masuda | G02F 1/133308 348/794 |
| 2015/0219840 A1 | 8/2015 | Kwon et al. | |
| 2016/0259121 A1* | 9/2016 | Yonezawa | G02F 1/1333 |

FOREIGN PATENT DOCUMENTS

| | | |
|---|---|---|
| CN | 103453463 A | 12/2013 |
| CN | 203442617 U | 2/2014 |
| JP | 2000-056303 A | 2/2000 |
| JP | 2010-096918 A | 4/2010 |

* cited by examiner

US 9,658,386 B2

BACKLIGHT SOURCE AND DISPLAY DEVICE

TECHNICAL FIELD

Embodiments of the present disclosure relate to a backlight source and a display device.

BACKGROUND

A Liquid Crystal Display includes a liquid crystal panel and a backlight source. Backlight sources can mainly be classified into Light Emitting Diode (LED) backlight sources and Cold Cathode Fluorescent Lamp (CCFL) backlight sources according to the type of the used light sources. For mobile phones, tablet computers, displays, televisions and so on, backlight sources of different sizes are applied. In recent years, LED backlight sources become the optimal choice in the field of liquid crystal display due to its excellent optical effects and thin profile for display devices.

SUMMARY

According to at least an embodiment of the present disclosure, there is proposed a backlight source, so as to avoid occurrence of such a phenomenon that an optical film sheet wrinkles in a high-temperature and high-humidity test in the backlight source.

According to at least an embodiment of the disclosure, there is proposed a backlight source, which includes a frame, an optical film sheet, a light guiding plate and an embedded block, wherein a coefficient of volume expansion of the embedded block is greater than a coefficient of volume expansion of the frame; the optical film sheet is laminated on the light guiding plate, and the optical film sheet and the light guiding plate are disposed within the frame; the frame has a first transverse protrusion formed in its upper part at a side in proximity to the light guiding plate, a bottom surface of the first transverse protrusion is attached to the light guiding plate by pressing, and a bottom surface of the first transverse protrusion has a groove provided therein, in which the embedded block is arranged; the first transverse protrusion has a second transverse protrusion formed in its upper part at a side in proximity to the optical film sheet, and a bottom surface of the second transverse protrusion is attached to the optical film sheet by pressing.

According to at least an embodiment of the disclosure, there is further provided a display device, which includes the backlight source as stated above.

BRIEF DESCRIPTION OF THE DRAWINGS

In order to illustrate the technical solution of the embodiments of the disclosure more clearly, the drawings of the embodiments will be briefly described below; it is obvious that the drawings as described below are only related to some embodiments of the disclosure, but not limitative of the disclosure.

REFERENCE NUMERALS

1—back panel; 2—frame; 3—bottom reflector; 4—light guiding plate; 5—optical film sheet; 6—embedded block.

DETAILED DESCRIPTION

In order to make objects, technical details and advantages of the embodiments of the disclosure apparent, hereinafter, the technical solutions of the embodiments of the disclosure will be described in a clearly and fully understandable way in connection with the drawings related to the embodiments of the disclosure. It is obvious that the described embodiments are just a part but not all of the embodiments of the disclosure. Based on the described embodiments of the disclosure, those ordinarily skilled in the art can obtain other embodiment(s), without any inventive work, which should be within the scope sought for protection by the disclosure.

In the present disclosure, the terms "first" and "second" are merely used for illustrative purpose, and cannot be understood as indicator or implication of relative importance. The term "plurality" refers to two or more than two, unless otherwise expressly limited. Additionally, it can be understood that when an element or layer is referred to as being "on" another element or layer, it can be directly on the other element, or an intervening layer may be present therebetween; when an element or layer is referred to as being "under" another element or layer, it can be directly under the other element, or an intervening layer or element may be present therebetween.

In the developing course of a backlight source, it is necessary to conduct a series of tests/experiments, such as, a vibration test, a thermal shock test, a high-temperature and high-humidity test, a drop test and so on.

Figure 1:
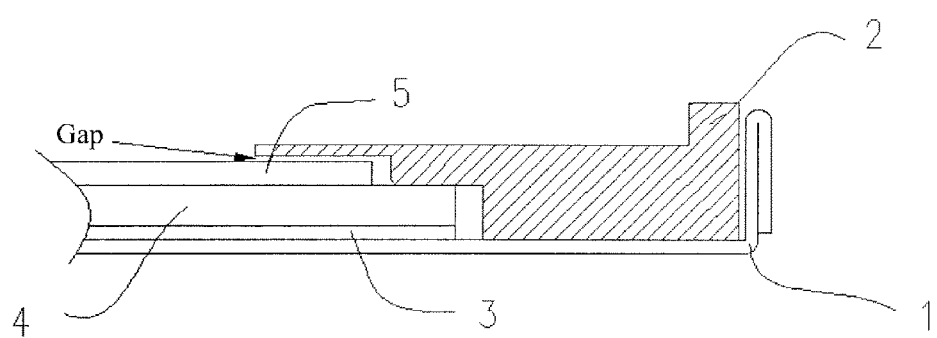
FIG. 1 is a structurally, schematically sectional view illustrating a backlight source.

FIG. 1 is a schematically sectional view illustrating a backlight source, and as shown in the figure, a frame 2, a bottom reflector 3, a light guiding plate 4, an optical film sheet 5 and other modules are arranged in a back panel 1. As noted by inventors, in the developing course of the backlight source, the suitable size of a gap (denoted by an arrow) between the frame 2 and the optical film sheet 5 is very difficult to obtain. When the backlight source is subjected to a vibration test, if the gap between the optical film sheet 5 and the frame 2 is bigger than a required value, then the optical film sheet 5 will move over a surface of the light guiding plate 4 to produce physical friction, and abrasion defects may result, or scraps may fall off the optical film sheet 5 to cause foreign substance defects; if the gap is too small, then when the backlight source is placed in a high-temperature and high-humidity test, expansion of the light guiding plate 4 and the optical film sheet 5 will lead to a further squeeze of the gap, and this will bring about such an effect that sheet wrinkle defects may occur in the backlight source. These defects may result in the result that the product under development is difficult to pass a reliability test in the developing course, and thus the developing course of the backlight source is disadvantageously affected.

Figure 2:
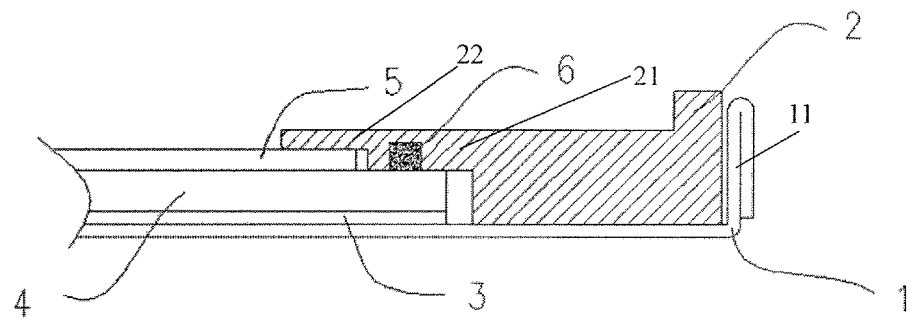
FIG. 2 is a structurally, schematically sectional view illustrating a backlight source according to an embodiment of the disclosure.

As shown in FIG. 2, according to an embodiment of the disclosure, there is proposed a backlight source that includes a frame 2, an optical film sheet 5 and a light guiding plate 4, which further includes an embedded block 6. The coefficient of volume expansion of the embedded block 6 is greater than the coefficient of volume expansion of the frame 2. The optical film sheet 5 and the light guiding plate 4 are sequentially laminated and disposed in the frame 2. For example, the contour/profile of the backlight source is a rectangle, and thus, the contour/profile of the frame 2, the optical film sheet 5 and the light guiding plate 4 is also a rectangle. The frame 2 is, such as, in the shape of a square frame, and useful for fixing the optical film sheet 5 and the light guiding plate 4 therein.

The frame 2 has a first transverse protrusion 21 formed at a side in proximity to the light guiding plate 4 and extending inwards, a bottom surface of the first transverse protrusion 21 being attached to the light guiding plate 4 by pressing, and the bottom surface of the first transverse protrusion 21 has a groove provided therein, in which the embedded block 6 is arranged. The first transverse protrusion 21 has a second transverse protrusion 22 formed in its upper part at a side in proximity to the optical film sheet 5 and extending inwards, and a bottom surface of the second transverse protrusion 22 is attached to the optical film sheet 5 by pressing. As shown in FIG. 2, the optical film sheet 5 is disposed over the light guiding plate 4, and the light guiding plate 4 has a portion extending beyond the optical film sheet 5 at a side in proximity to the frame 2.

The backlight source further includes a back panel 1, and the frame 2, the optical film sheet 5 and the light guiding plate 4 are all disposed on the back panel 1. As shown in FIG. 2, the back panel 1 may also have a folded side 11 formed at its periphery, and thereby, the stack of the above structures is located in the structure formed by the back panel 1.

In addition, a bottom reflector 3 may be provided in the back panel 1, in such a manner that the light guiding plate 4 is disposed on the reflector 3, and the optical film sheet 5 is disposed on the light guiding plate 4. Or, a surface (an inner surface) of the back panel 1 facing the light guiding plate 4, for example, a metal plated layer is formed to be a reflective face, and in this case, a separate bottom reflector 3 may not be included.

By pressing the second transverse protrusion 22 onto the optical film sheet 5, a relative movement will not occur between the optical film sheet 5 and the light guiding plate 4 when the backlight source is subjected to a vibration test, so as to avoid scraps falling off the optical film sheet 5 or abrasion of the backlight source.

Figure 3A:
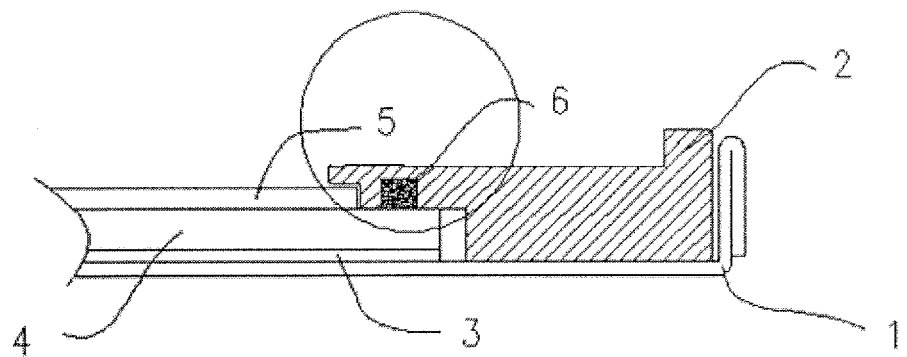
FIG. 3A and FIG. 3B are partially enlarged schematic views illustrating a backlight source according to an embodiment of the disclosure.
Figure 3B:
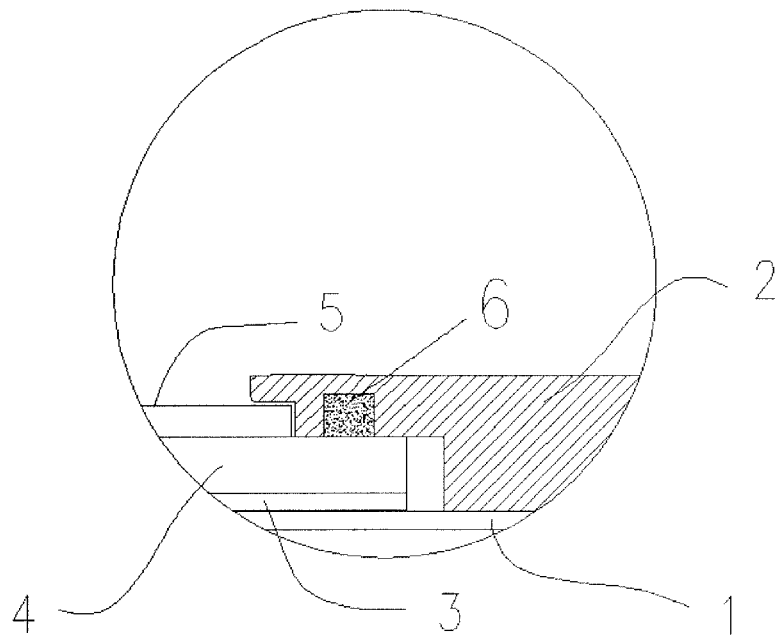

As shown in FIG. 3A and FIG. 3b, an embedded block 6 is arranged at a bottom surface of the first transverse protrusion 21. A specific shape may be chosen for the embedded block 6, and for example, it may be a cuboid or a cylinder. When a high-temperature and high-humidity test is conducted, because the coefficient of volume expansion of the embedded block 6 is greater than the coefficient of volume expansion of the frame 2, (namely, when the ambient temperature is raised by the same temperature, in the condition of a same volume, the expanded volume of the embedded block 6 is larger than that of the frame 2), the second transverse protrusion 22 of the frame 2 can be lifted up by the embedded block 6 to a certain height. Thereby, the second transverse protrusion 22 is detached from the light guiding plate 4, so as to form a gap between it and the light guiding plate 4. With this structure, the following case is avoided: when the light guiding plate 4 is involved in a high-temperature and high-humidity test, an excessive squeeze takes place between the light guiding plate 4 and the optical film sheet 5 thereby causing the optical film sheet 5 to wrinkle (namely, sheet wrinkle defects is incurred). Thus, reliability of test results is ensured.

In at least an embodiment of the disclosure, a front end of the first transverse protrusion 21 has a round corner or chamfer formed at a side in contact with the light guiding plate 4.

In at least an embodiment of the disclosure, a front end of the second transverse protrusion 22 has a round corner or chamfer formed at a side in contact with the optical film sheet 5.

By arranging a side of the top of the first transverse protrusion 21 in contact with the light guiding plate 4 to be rounded/chamfered, and arranging a side of the top of the second transverse protrusion 22 in contact with the optical film sheet 5 to be rounded/chamfered, the light guiding plate 4 or the optical film sheet 5 can be prevented from being scratched by the frame 2. Thus, the reliability of test results is further ensured.

In at least an embodiment of the disclosure, a bottom surface of the embedded block 6 is flush with a bottom surface of the first transverse protrusion 21 at a room temperature. Friction of the embedded block against the light guiding plate 4 at the room temperature can be avoided, and the room temperature involved in the context may be in the range of 5° C. to 35° C.

In at least an embodiment of the disclosure, a gap is formed between a lower part of the frame 2 at a side in proximity to the light guiding plate 4 and the light guiding plate 4. A squeeze of the light guiding plate 4 caused by one side of the frame 2 at a room temperature can be avoided, and the following case can also be avoided: an excessive expansion of the frame 2 in a high-temperature test results in the fact that the light guiding plate 4 is squeezed by its side.

In at least an embodiment of the disclosure, a gap is formed between a lower part of the first transverse protrusion 21 at a side in proximity to the optical film sheet 5 and the light guiding plate 4. A squeeze of the optical film sheet 5 caused by one side of the first transverse protrusion 21 at a room temperature can be avoided, and such a case that an excessive expansion of the first transverse protrusion 21 in a high-temperature test results in the fact that the optical film sheet 5 is squeezed by its side can also be avoided. Thus, a wrinkling phenomenon is further avoided.

In at least an embodiment of the disclosure, the coefficient of volume expansion of the frame is larger than or equal to $2\times10^{-5}/°$ C. and smaller than or equal to $3\times10^{-5}/°$ C.; and the coefficient of volume expansion of the embedded block is larger than or equal to $6\times10^{-5}/°$ C. and smaller than or equal to $7.38\times10^{-5}/°$ C.

In at least an embodiment of the disclosure, the material of the frame may include polycarbonate and/or a mixture of polycarbonate and glass fiber.

In at least an embodiment of the disclosure, the material of the embedded block 6 may include polyvinyl chloride and/or acrylonitrile butadiene styrene (ABS) resin.

According to at least an embodiment of the disclosure, there is further proposed a display device, which includes a backlight source as stated by any of above embodiments.

In at least an embodiment of the disclosure, on one hand, by means of attaching a second transverse protrusion on a frame with an optical film sheet by pressing, a relative movement will not occur between the optical film sheet and a light guiding plate when the backlight source is subjected to a vibration test, and thus scraps falling off the optical film sheet or abrasion of the backlight source is avoided. On the other hand, by allowing the coefficient of volume expansion of an embedded block to be larger than the coefficient of volume expansion of the frame, upon a high-temperature and high-humidity test, the expanded volume of the embedded block is larger than the expanded volume of the frame, and a bonded section of the second transverse protrusion on the frame with the optical film sheet will be lifted up. Thus, the following case is avoided: an excessive squeeze takes place between the optical film sheet and the second transverse protrusion, so that a sheet wrinkling phenomenon occurs to the optical film sheet.

It is to be noted that, the display device in the embodiment may be a display panel, an electronic paper, a cell phone, a tablet computer, a television, a notebook computer, a digital photo frame, a navigator or any other product or component having a display function.

Descriptions made above are merely exemplary embodiments of the disclosure, but are not used to limit the protection scope of the disclosure. The protection scope of the disclosure is defined by the attached claims.

This application claims the benefit of priority from Chinese patent application No. 201410530960.9, filed on Oct. 10, 2014, the disclosure of which is incorporated herein in its entirety by reference as a part of the present application.

What is claimed is:

1. A backlight source, comprising a frame, an optical film sheet, a light guiding plate and an embedded block,
    wherein a coefficient of volume expansion of the embedded block is greater than a coefficient of volume expansion of the frame,
    the optical film sheet is laminated on the light guiding plate, and the optical film sheet and the light guiding plate are disposed within the frame;
    the frame has a first transverse protrusion formed in its upper part at a side in proximity to the light guiding plate, a bottom surface of the first transverse protrusion is attached to the light guiding plate by pressing, and a bottom surface of the first transverse protrusion has a groove provided therein, in which the embedded block is arranged;
    the first transverse protrusion has a second transverse protrusion formed in its upper part at a side in proximity to the optical film sheet, and a bottom surface of the second transverse protrusion is attached to the optical film sheet by pressing.

2. The backlight source claimed as claim 1, wherein a front end of the first transverse protrusion has a round corner formed at a side in contact with the light guiding plate.

3. The backlight source claimed as claim 1, wherein a front end of the second transverse protrusion has a round corner formed at a side in contact with the optical film sheet.

4. The backlight source claimed as claim 1, wherein a bottom surface of the embedded block is flush with a bottom surface of the first transverse protrusion at a room temperature.

5. The backlight source claimed as claim 1, wherein a gap is provided between a lower part of the frame at a side in proximity to the light guiding plate and the light guiding plate.

6. The backlight source claimed as claim 1, wherein a gap is provided between a lower part of the first transverse protrusion at a side in proximity to the optical film sheet and the light guiding plate.

7. The backlight source claimed as claim 1, wherein the coefficient of volume expansion of the frame is larger than or equal to $2 \times 10^{-5}/°C$. and smaller than or equal to $3 \times 10^{-5}/°C$.; and
    the coefficient of volume expansion of the embedded block is larger than or equal to $6 \times 10^{-5}/°C$. and smaller than or equal to $7.38 \times 10^{-5}/°C$.

8. The backlight source claimed as claim 7, wherein a material of the frame includes polycarbonate and/or a mixture of polycarbonate and glass fiber.

9. The backlight source claimed as claim 7, wherein a material of the embedded block includes polyvinyl chloride and/or acrylonitrile butadiene styrene resin.

10. The backlight source claimed as claim 1, further comprising a back panel, wherein the frame, the optical film sheet and the light guiding plate are disposed on the back panel.

11. The backlight source claimed as claim 10, wherein a surface of the back panel at a side facing the light guiding plate is a reflective face.

12. The backlight source claimed as claim 10, further comprising a bottom reflecting plate,
    wherein the bottom reflecting plate is disposed on the back panel, and the optical film sheet and the light guiding plate are disposed on the bottom reflecting plate.

13. A display device, comprising the backlight source claimed as claim 1.

* * * * *